United States Patent
Takano et al.

(10) Patent No.: US 12,227,600 B2
(45) Date of Patent: Feb. 18, 2025

(54) POLYISOPRENE, RUBBER COMPOSITION, AND TIRE

(71) Applicant: BRIDGESTONE CORPORATION, Tokyo (JP)

(72) Inventors: Shigenaga Takano, Tokyo (JP); Aya Hotta, Tokyo (JP); Satoru Tamaki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 772 days.

(21) Appl. No.: 17/438,644

(22) PCT Filed: Jan. 28, 2020

(86) PCT No.: PCT/JP2020/003025
§ 371 (c)(1),
(2) Date: Sep. 13, 2021

(87) PCT Pub. No.: WO2020/208901
PCT Pub. Date: Oct. 15, 2020

(65) Prior Publication Data
US 2022/0185921 A1 Jun. 16, 2022

(30) Foreign Application Priority Data
Apr. 12, 2019 (JP) .................. 2019-076621

(51) Int. Cl.
*C08F 136/08* (2006.01)
*B60C 1/00* (2006.01)
(Continued)

(52) U.S. Cl.
CPC ............. *C08F 136/08* (2013.01); *B60C 1/00* (2013.01); *C08F 36/08* (2013.01); *C08L 9/00* (2013.01)

(58) Field of Classification Search
CPC .......... C08F 136/08; C08F 36/08; C08L 9/00; B60C 1/00
(Continued)

(56) References Cited

U.S. PATENT DOCUMENTS 9,033,014 B2 5/2015 Suzuki et al.
10,087,312 B2 10/2018 Matsushita et al.
(Continued)

FOREIGN PATENT DOCUMENTS

| CN | 104159930 A | 11/2014 |
|---|---|---|
| CN | 108779298 A | 11/2018 |

(Continued)

OTHER PUBLICATIONS

International Preliminary Report on Patentability dated Sep. 28, 2021 with a Translation of the Written Opinion of the International Searching Authority in Application No. PCT/JP2020/003025.
(Continued)

*Primary Examiner* — Ruiyun Zhang
(74) *Attorney, Agent, or Firm* — Sughrue Mion, PLLC

(57) ABSTRACT

The present disclosure provides a polyisoprene wherein: a vinyl bond content of the polyisoprene is 30 mol % or higher; and a ratio of the weight-average absolute molecular weight (Mw') determined by GPC-MALS with respect to the weight-average molecular weight (Mw) in terms of polystyrene determined by GPC, i.e., Mw'/Mw, is 0.850 or less. A rubber composition containing the polyisoprene is excellent in the fuel-saving performance and grip performance on a wet road surface, as compared with a rubber composition containing the conventional polyisoprene.

15 Claims, 1 Drawing Sheet

(51) Int. Cl.
*C08F 36/08* (2006.01)
*C08L 9/00* (2006.01)

(58) Field of Classification Search
USPC .......................................................... 523/156
See application file for complete search history.

(56) References Cited

U.S. PATENT DOCUMENTS

| | | |
|---|---|---|
| 2004/0127659 A1 | 7/2004 | Kerns et al. |
| 2014/0249276 A1 | 9/2014 | Budeeva et al. |
| 2018/0282459 A1 | 10/2018 | Kimura et al. |
| 2019/0055395 A1 | 2/2019 | Yamagata et al. |
| 2021/0179824 A1 | 6/2021 | Nakashima |

FOREIGN PATENT DOCUMENTS

| | | | |
|---|---|---|---|
| CN | 108929396 | A | 12/2018 |
| EP | 2 017 280 | A1 | 1/2009 |
| EP | 3 184 554 | B1 | 9/2019 |
| GB | 2516233 | A | 1/2015 |
| JP | 1-174547 | A | 7/1989 |
| JP | 2000-154210 | A | 6/2000 |
| JP | 2008-214484 | A | 9/2008 |
| JP | 2011-099026 | A | 5/2011 |
| JP | 2013-163759 | A | 8/2013 |
| JP | 2014-162809 | A | 9/2014 |
| JP | 2017-088770 | A | 5/2017 |
| JP | 2018-2986 | A | 1/2018 |
| WO | 2005/003226 | A1 | 1/2005 |
| WO | 2007/129670 | A1 | 11/2007 |
| WO | 2016/027401 | A1 | 2/2016 |
| WO | 2017/029936 | A1 | 2/2017 |
| WO | 2017/064859 | A1 | 4/2017 |

OTHER PUBLICATIONS

Jiazhen Chen, et al., "Metal and Counteranion Nuclearity Effects in Organoscandium-Catalyzed Isoprene Polymerization and Copolymerization", ACS Catal., 2017, vol. 7, pp. 5214-5219 (6 pages total).

Gaixia Du, et al., "Copolymerization of Isoprene with Ethylene Catalyzed by Cationic Half-Sandwich Fluorenyl Scandium Catalysts", Journal of Polymer Science Part A: Polymer Chemistry, 2015, vol. 53, 2898-2907 (10 pages total).

Lixin Zhang, et al., "Unprecedented Isospecific 3,4-Polymerization of Isoprene by Cationic Rare Earth Metal Alkyl Species Resulting from a Binuclear Precursor", J. Am. Chem. Soc., 2005, vol. 127, No. 42, pp. 14562-14563 (2 pages total).

International Search Report for PCT/JP2020/003025 dated Apr. 14, 2020.

Ming-lu Huang, "Design and Synthesis of Weak Bond-Containing Styrene Derivatives Monomers and Its Polymers and Their Applications in Rubber", Chinese Doctoral Dissertations, Engineering Science and Technology, Series 1, 2018 (157 pages total).

Jian-huang Chen et al., "Study on Properties of Domestic Cis-1, 4-polybutadiene Rubber with Neodymium Catalyst System", Special Purpose Rubber Products, Oct. 2013, vol. 34, No. 5 (4 pages total).

Yi-xin Xiang et al., "Grafting Polyisoprene onto Surfaces of Nano-Silica via RAFT Polymerization and Modification of SBS", Polymer Bulletin, 2019, Issue 3, pp. 43-50 (8 pages total).

Search Report only issued Nov. 10, 2022 in Chinese Application No. 202080028159.8.

Search Report only of the Extended European Search Report issued Dec. 22, 2022 in European Application No. 20788212.7.

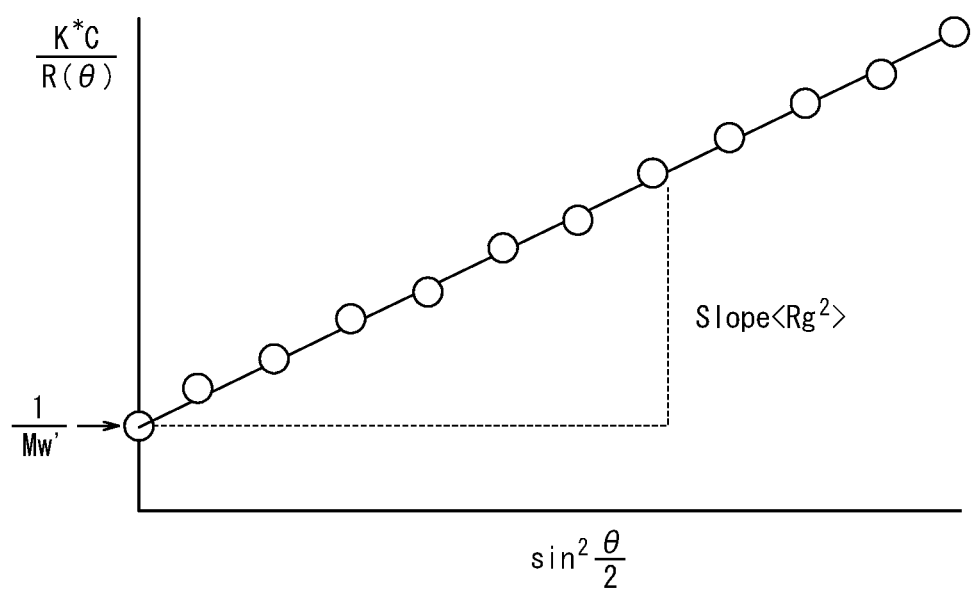

POLYISOPRENE, RUBBER COMPOSITION, AND TIRE

CROSS REFERENCE TO RELATED APPLICATIONS

This application is a National Stage of International Application No. PCT/JP2020/003025 filed Jan. 28, 2020, claiming priority based on Japanese Patent Application No. 2019-076621 filed Apr. 12, 2019.

TECHNICAL FIELD

The present invention relates to polyisoprene, a rubber composition, and a tire.

BACKGROUND ART

Polyisoprene typically represented by natural rubber has been conventionally and widely used in rubber articles such as a tire. Natural rubber as natural polyisoprene has a cis-1, 4 bond content of substantially 100 mol % and thus exhibits superior physical properties including superior durability. The physical properties of polyisoprene can be controllably changed by increasing/decreasing a vinyl bond content thereof, in this regard. There has been known a synthetic polyisoprene having a high vinyl bond content (e.g., PTL 1 shown below). Further, product name "Isogrip" manufactured by KARBOCHEM Ltd. is known as a commercially available synthetic polyisoprene having a high vinyl bond content.

CITATION LIST

Patent Literature

PTL 1: JP 01-174547 A (1989)

SUMMARY OF THE INVENTION

Technical Problems

However, the conventional polyisoprene having a high vinyl bond content exhibits a high degree of branching, thereby possibly deteriorating the fuel-saving performance of a tire, for example, when it is used for the tire.

In view of this, an object of the present disclosure is to provide a novel polyisoprene capable of solving the prior art problem described above and suppressing deterioration of the fuel-saving performance of a tire.

Further, another object of the present disclosure is to provide i) a rubber composition including the polyisoprene and exhibiting low hysteresis loss and ii) a tire (using the rubber composition and) being excellent in the fuel-saving performance thereof.

The primary features of the present disclosure for achieving the objects described above are as follows.

Polyisoprene of the present disclosure is characterized in that:

a vinyl bond content of the polyisoprene is 30 mol % or higher; and a ratio of the weight-average absolute molecular weight determined by GPC-MALS with respect to the weight-average molecular weight in terms of polystyrene determined by GPC [(weight-average absolute molecular weight)/(weight-average molecular weight in terms of polystyrene)] is 0.850 or less.

The polyisoprene of the present disclosure has a high content of vinyl bond and a low degree of branching, thereby being capable of suppressing deterioration of the fuel-saving performance of a tire when the polyisoprene is used for the tire. Further, the polyisoprene of the present disclosure, when it is used for a tire, can also improve grip performance on a wet road surface of the tire.

In a preferable example of the polyisoprene of the present disclosure, a branching index (a $g_w$ value) determined by GPC-MALS and treated by the weight average is 0.42 or higher. In this case, it is possible to improve the fuel-saving performance of a tire by using the polyisoprene for the tire.

In another preferable example of the polyisoprene of the present disclosure, the vinyl bond content of the polyisoprene is 50 mol % or higher. In this case, it is possible to further improve grip performance on a wet road surface of a tire by using the polyisoprene for the tire.

In yet another preferable example of the polyisoprene of the present disclosure, a 1,2-vinyl bond content of the polyisoprene is 1 mol % or less. Such a polyisoprene can be easily manufactured by a method described below.

A rubber composition of the present disclosure is characterized in that it contains the polyisoprene described above.

The rubber composition of the present disclosure exhibits relatively small hysteresis loss and successfully improves the fuel-saving performance of a tire when the rubber composition is used for the tire. Further, the rubber composition of the present disclosure, when it is used for a tire, can also improve grip performance on a wet road surface of the tire.

A tire of the present disclosure is characterized in that it uses the rubber composition described above. The tire of the present disclosure is excellent in the fuel-saving performance. Further, the tire of the present disclosure is excellent in grip performance on a wet road surface thereof, as well.

According to the present disclosure, it is possible to provide a novel polyisoprene capable of suppressing deterioration of the fuel-saving performance of a tire.

Further, according to the present disclosure, it is possible to provide i) a rubber composition including the polyisoprene and exhibiting low hysteresis loss and ii) a tire (using the rubber composition and) being excellent in the fuel-saving performance thereof.

BRIEF DESCRIPTION OF THE DRAWING

In the accompanying drawing, wherein:

FIG. 1 is an explanatory view of a Debye plot obtained by GPC-MALS.

DETAILED DESCRIPTION

Hereinafter, a polyisoprene, a rubber composition, and a tire of the present disclosure will be demonstratively described in detail based on embodiments thereof.

<Polyisoprene>

The polyisoprene of the present disclosure is characterized in that: a vinyl bond content of the polyisoprene is 30 mol % or higher; and a ratio of the weight-average absolute molecular weight determined by GPC-MALS with respect to the weight-average molecular weight in terms of polystyrene determined by GPC [(weight-average absolute molecular weight)/(weight-average molecular weight in terms of polystyrene)] is 0.850 or less.

The GPC-MALS is an analytical method as a combination of gel permeation chromatography (GPC) and multi-angle light scattering (MALS), by which the absolute molecular weight of a polyisoprene can be measured. In the present disclosure, the weight average value of an absolute molecular weight, calculated by subjecting each measured absolute molecular weight to weighting by the weight average, i.e., the weight average absolute molecular weight (Mw'), is employed. It is possible, by carrying out the weighting by the weight average, to obtain the average molecular weight which more clearly reflects than otherwise an effect of a component having a large molecular weight and thus significantly affecting the physical properties.

The weight average absolute molecular weight (Mw') and a radius of gyration (Rg) relevant to the polyisoprene can be determined by: analyzing by using a MALS detector the respective components, separated by GPC, of the polyisoprene; and generating a Debye plot based thereon (see FIG. 1).

In FIG. 1, Mw' represents the weight-average absolute molecular weight, K* represents an optical parameter, C represents the concentration, R(θ) represents a Rayleigh ratio of excess scattering of light, Rg represents a radius of gyration, and $<Rg^2>$ represents a root-mean-square of the radius of gyration. A differential refractive index (RI) detector is generally used for measuring the concentration of a soluble component in this regard. It is then possible to calculate i) the relevant weight-average absolute molecular weight (Mw') from an intercept of the Debye plot and ii) the relevant radius of gyration (Rg) from the slope of the line thus plotted.

On the other hand, the weight-average molecular weight in terms of polystyrene (Mw) is a molecular weight calculated by subjecting the molecular weight in terms of polystyrene as a reference material (the relative molecular weight) to weighting by the weight average.

GPC carries out separation of respective components by a column according to the size of a molecule, such that a polyisoprene component having the larger molecular size is eluted the faster. It should be noted in this regard that a polyisoprene molecule having a number of branches has a more spherical shape than a polyisoprene molecule not having so many branches, whereby in GPC the former has a relatively small molecular size and thus a relatively small weight-average molecular weight in terms of polystyrene, as compared with the latter, although the former and the latter actually share the same molecular weight. In contrast, GPC-MALS does not measure a molecular weight in terms of polystyrene but an absolute molecular weight, thereby being less likely to be affected by a degree of branching. Accordingly, the higher degree of branching results in the higher ratio of the weight-average absolute molecular weight (Mw') determined by GPC-MALS with respect to the weight-average molecular weight (Mw) in terms of polystyrene determined by GPC [(weight-average absolute molecular weight (Mw'))/(weight-average molecular weight in terms of polystyrene (Mw))], whereas the lower degree of branching results in the lower ratio of Mw'/Mw. The conventional polyisoprene having a high content of vinyl bond exhibits a high value of (weight-average absolute molecular weight (Mw'))/(weight-average molecular weight in terms of polystyrene (Mw)) as an index of degree of branching, which exceeds 0.850, whereas the polyisoprene of the present disclosure exhibits (weight-average absolute molecular weight (Mw'))/(weight-average molecular weight in terms of polystyrene (Mw)), which is 0.850 or less. Therefore, the polyisoprene of the present disclosure, while having a relatively high vinyl bond content (≥30 mol %), exhibits a ratio of (weight-average absolute molecular weight (Mw'))/(weight-average molecular weight in terms of polystyrene (Mw)) of 0.850 or less, i.e., a low degree of branching. The polyisoprene of the present disclosure, thus having a low degree of branching, exhibits low hysteresis loss and successfully suppresses deterioration of the fuel-saving performance of a tire when the polyisoprene is used for the tire.

The polyisoprene of the present disclosure has a ratio of (weight-average absolute molecular weight (Mw'))/(weight-average molecular weight in terms of polystyrene (Mw)) preferably in the range of 0.550≤Mw'/Mw≤0.800. A degree of branching of the polyisoprene further decreases when (weight-average absolute molecular weight (Mw'))/(weight-average molecular weight in terms of polystyrene (Mw)) is ≤0.800. The polyisoprene can be easily manufactured by the method described below when (weight-average absolute molecular weight (Mw'))/(weight-average molecular weight in terms of polystyrene (Mw)) is ≥0.550.

In the polyisoprene of the present disclosure, a branching index determined by GPC-MALS and treated by the weight average, i.e., a $g_w$ value, is 0.42 or higher. The GPC-MALS is an analytical method as a combination of GPC and MALS, by which not only the aforementioned absolute molecular weight of a polyisoprene but also the root-mean-square of a radius of gyration of the polyisoprene at the absolute molecular weight can be measured, wherein the root-mean-square of a radius of gyration of the polyisoprene corresponds to the molecular size thereof at the absolute molecular weight. Provided that a branching index (i.e., a "g value") represents a value obtained by dividing the root-mean-square of a radius of gyration of a measurement sample ($<Rg^2>_{Sample}$) by the "theoretical" or "reference" root-mean-square of a radius of gyration of a linear polyisoprene having the same absolute molecular weight as the measurement sample ($<Rg^2>_{Linear}$), the branching index (the g value) is expressed as follows. Branching index (g value)=$<Rg^2>_{Sample}/<Rg^2>_{Linear}$ In the present disclosure, the closer the branching index (the g value) to 1, the lower is a degree of branching of the measurement sample.

The branching index (the $g_w$ value) calculated by subjecting the branching index (the g value) at each absolute molecular weight to weighting by the weight average, i.e., the branching index (the $g_w$ value) treated by the weight average, is a branching index which more clearly reflects than otherwise an effect of a component having a large molecular weight and thus significantly affecting the physical properties. Weighting by the weight average can be carried out by $\Sigma g_i M_i / \Sigma M_i$, provided that $g_i$ represents a branching index at an absolute molecular weight $M_i$.

In the present disclosure, a radius of gyration of a linear polyisoprene is larger than a radius of gyration of an abundantly branched polyisoprene having the same molecular weight, whereby the root-mean-square of a radius of gyration of the linear polyisoprene is larger than the root-mean-square of a radius of gyration of the abundantly branched polyisoprene having the same molecular weight. Accordingly, the lower the degree of branching of a measurement sample is, the larger the branching index (the $g_w$ value) thereof becomes to approximate 1. Therefore, a polyisoprene having a branching index (a $g_w$ value) of 0.42 or higher reasonably has a significantly low degree of branching, whereby it is possible to improve the fuel-saving performance of a tire by using the polyisoprene for the tire.

In the polyisoprene of the present disclosure, the branching index (the $g_w$ value) treated by the weight average is more preferably ≥0.45 and preferably ≤0.80. A degree of branching of the polyisoprene further decreases when the branching index (the $g_w$ value) treated by the weight average is ≥0.45. Moreover, the polyisoprene can be easily manufactured by the method described below when the branching index (the $g_w$ value) treated by the weight average is ≤0.80.

In the polyisoprene of the present disclosure, a vinyl bond content of the polyisoprene is to be ≥30 mol % and preferably ≥50 mol %. It is possible to improve grip performance on a wet road surface of a tire by using for the tire a rubber composition containing polyisoprene of which vinyl bond content is ≥30 mol %. The grip performance on a wet road surface, of a tire, can be further improved when a vinyl bond content of the polyisoprene is ≥50 mol %. The upper limit of a vinyl bond content of the polyisoprene is not particularly restricted and may be 100 mol %. However, a vinyl bond content of the polyisoprene of the present disclosure is preferably ≤85 mol % because a polyisoprene of which vinyl bond content is ≤85 mol % can be easily manufactured by the method described below.

The vinyl bond content of the polyisoprene described above represents the sum of a 1,2-vinyl bond content (i.e., a content of 1,2-bonding unit of isoprene) and a 3,4-vinyl bond content (i.e., a content of 3,4-bonding unit of isoprene). In this regard, a 1,2-vinyl bond content of the polyisoprene of the present disclosure is preferably ≤1 mol %, more preferably 0.5 mol %, and may be 0 mol % (that is, ≤the lower limit detectable by NMR). In the conventional polyisoprene having a high content of vinyl bond, a 1,2-vinyl bond content is high and exceeds 1 mol %, whereas the polyisoprene according to a preferable aspect of the present disclosure characteristically has a low 1,2-vinyl bond content. Further, a polyisoprene of which 1,2-vinyl bond content is ≤1 mol % can be easily manufactured by the method described below.

In the polyisoprene of the present disclosure, the weight-average molecular weight in terms of polystyrene (Mw) is preferably in the range of 100,000 to 4,000,000 and more preferably in the range of 230,000 to 3,000,000. In a case where the polyisoprene is used for a rubber composition, mechanical strength of the rubber composition successfully improves when Mw is ≥100,000 and workability of the rubber composition successfully improves when Mw is ≤4,000,000.

In the polyisoprene of the present disclosure, the number-average molecular weight in terms of polystyrene (Mn) is preferably in the range of 50,000 to 2,000,000 and more preferably in the range of 125,000 to 1,500,000. In a case where the polyisoprene is used for a rubber composition, mechanical strength of the rubber composition successfully improves when Mn is ≥50,000 and workability of the rubber composition successfully improves when Mn is ≤2,000,000.

In the polyisoprene of the present disclosure, the molecular weight distribution (the weight-average molecular weight in terms of polystyrene (Mw)/the number-average molecular weight in terms of polystyrene (Mn)) is preferably in the range of 1 to 4. The physical properties of the polyisoprene exhibit satisfactory uniformity when the molecular weight distribution of the polyisoprene is ≤4.

In the polyisoprene of the present disclosure, the weight-average absolute molecular weight (Mw') is preferably in the range of 80,000 to 3,000,000 and more preferably in the range of 155,000 to 2,500,000. In a case where the polyisoprene is used for a rubber composition, mechanical strength of the rubber composition successfully improves when Mw' is ≥80,000 and workability of the rubber composition successfully improves when Mw' is ≤3,000,000.

In the polyisoprene of the present disclosure, the glass transition temperature (Tg) measured by a differential scanning calorimeter (DSC) is preferably in the range of −60° C. to 20° C. and more preferably in the range of −35° C. to 20° C. A vinyl bond content of the polyisoprene can be easily increased when the glass transition temperature thereof is −60° C. or higher. Further, a polyisoprene of which glass transition temperature is 20° C. or lower can be easily manufactured by the method described below.

In the present disclosure, the aforementioned glass transition temperature values are those measured by a differential scanning calorimeter according to JIS K 7121-1987.

The polyisoprene of the present disclosure can be manufactured by polymerizing isoprene under the presence of a polymerization catalyst composition containing at least one type of complex selected from the group consisting of:

a metallocene complex represented by following general formula (I)

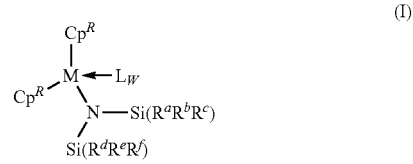

(In formula (I), M represents lanthanoid, scandium or yttrium; $Cp^R$s each independently represent substituted indenyl; $R^a$ to $R^f$ each independently represent a $C_{1-3}$ alkyl group or hydrogen atom; L represents a neutral Lewis base; and w represents an integer in the range of 0 to 3);

a metallocene complex represented by following general formula (II)

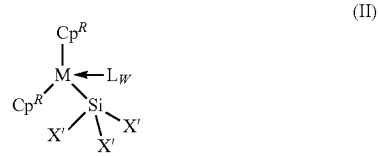

(In formula (II), M represents lanthanoid, scandium or yttrium; $Cp^R$s each independently represent substituted indenyl; X's each independently represent hydrogen atom, halogen atom, alkoxy, thiolate, amide, silyl, or a $C_{1-20}$ monovalent hydrocarbon group; L represents a neutral Lewis base; and w represents an integer in the range of 0 to 3); and a half metallocene cation complex represented by following general formula (III)

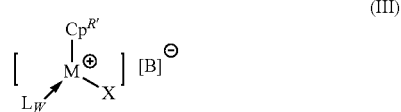

(In formula (III), M represents a lanthanoid element, scandium or yttrium; $Cp^{R'}$ represents substituted cyclopentadienyl, substituted indenyl or substituted fluorenyl; X represents hydrogen atom, halogen atom, alkoxy, thiolate, amide, silyl, or a $C_{1-20}$ monovalent hydrocarbon group; L represents a neutral Lewis base; w represents an integer in the range of 0 to 3; and $[B]^-$ represents a non-coordinating anion).

The polymerization catalyst composition may further include other components included in a conventional metallocene complex-containing polymerization catalyst composition, e.g., a prompter. In the present disclosure, a "metallocene complex" represents a complex compound in which at least one cyclopentadienyl or derivative thereof is bonded to a core metal. In this connection, a metallocene complex in which only a single cyclopentadienyl or derivative thereof (indenyl, fluorenyl, or the like) is bonded to a core metal may occasionally be referred to as a "half metallocene complex" in particular.

The concentration of the complex contained in the polymerization catalyst composition is preferably in the range of 0.0001 mol/L to 0.1 mol/L in the polymerization reaction system.

$Cp^R$s are substituted indenyls in the metallocene complexes represented by general formula (I) and general formula (II). $Cp^R$ having an indenyl ring as the base skeleton (i.e., substituted indenyl) may be represented as $C_9H_{7-y}R_y$ or $C_9H_{11-y}R_y$.

In this regard, y is an integer in the range of 1 to 7 or 1 to 11, representing the number of substituent group R on the indenyl ring. "y" is preferably ≥2, i.e., it is preferable that the substituted indenyl has two or more substituent groups. In a case where the substituted indenyl has two or more substituent groups R, R, then the $Cp^R$ becomes bulky and causes steric hindrance when isoprene approaches the core metal M, thereby facilitating an increase in vinyl bond content and a decrease in degree of branching in the resulting polyisoprene.

Further, it is preferable that at least one of the substituent groups R, R exists on the five-membered ring of the substituted indenyl. The substituted indenyl coordinates with the core metal M on the five-membered ring side thereof. Accordingly, in a case where the substituent group R exists on the five-membered ring of the substituted indenyl, $Cp^R$ causes steric hindrance when isoprene approaches the core metal M, thereby facilitating an increase in vinyl bond content and a decrease in degree of branching in the resulting polyisoprene.

The substituent group Rs preferably each represent hydrocarbyl or metalloid group. The number of carbon atoms of the hydrocarbyl group is preferably in the range of 1 to 20, more preferably in the range of 1 to 10, and further more preferably in the range of 1 to 8. Specifically, preferable examples of the hydrocarbyl group include methyl, ethyl, tert-butyl, phenyl, benzyl groups and the like. Examples of metalloid of the metalloid group include germyl Ge, stannyl Sn, and silyl Si. The metalloid group preferably includes a hydrocarbyl group which is defined in the same manner as the aforementioned hydrocarbyl group. Specific examples of the metalloid group include trimethylsilyl, tert-butyldimethylsilyl, and the like. Among these examples, at least one substituent group R is preferably a bulky substituent group such as phenyl, benzyl, tert-butyldimethylsilyl, or the like. In a case where the substituent group R is a bulky substituent group, $Cp^R$ becomes bulky and causes steric hindrance when isoprene to be polymerized approaches the core metal M, thereby facilitating an increase in vinyl bond content and a decrease in degree of branching in the resulting polyisoprene.

Specific examples of the substituted indenyl include 2-phenylindenyl, 1-methyl-2-phenylindenyl, 1,3-bis(tert-butyldimethylsilyl)indenyl, 1-tert-butyldimethylsilyl-3-trimethylsilylindenyl, 1-ethyl-2-phenylindenyl, 1-benzyl-2-phenylindenyl, and the like. The two $Cp^R$s in general formula (I) may be of either the same type or different types. The two $Cp^R$s in general formula (II) may be of either the same type or different types.

$Cp^{R'}$ is substituted cyclopentadienyl, substituted indenyl, or substituted fluorenyl group in the half metallocene cation complex represented by general formula (III). Substituted indenyl group is preferable as $Cp^{R'}$ among these examples.

$Cp^{R'}$ having a cyclopentadienyl ring as the base skeleton (i.e., substituted cyclopentadienyl) may be represented as $C_5H_{5-y}R_y$ in general formula (III).

In this regard, "y" is an integer in the range of 1 to 5, representing the number of substituent group R on the cyclopentadienyl ring. "y" is preferably ≥2, i.e., it is preferable that the substituted cyclopentadienyl has two or more substituent groups R, R. In a case where the substituted cyclopentadienyl has two or more substituent groups R, R, then $Cp^{R'}$ becomes bulkier and causes more significant steric hindrance when isoprene approaches the core metal M than otherwise, thereby further facilitating an increase in vinyl bond content and a decrease in degree of branching in the resulting polyisoprene. The substituent group Rs preferably each independently represent hydrocarbyl or metalloid group. The number of carbon atoms of the hydrocarbyl group is preferably in the range of 1 to 20, more preferably in the range of 1 to 10, and further more preferably in the range of 1 to 8. Specifically, preferable examples of the hydrocarbyl group include methyl, ethyl, tert-butyl, phenyl, benzyl groups and the like. Examples of metalloid of the metalloid group include germyl Ge, stannyl Sn, and silyl Si. The metalloid group preferably includes a hydrocarbyl group which is defined in the same manner as the aforementioned hydrocarbyl group. Specific examples of the metalloid group include trimethylsilyl, tert-butyldimethylsilyl, and the like. Among these examples, at least one substituent group R is preferably a bulky substituent group such as phenyl, benzyl, tert-butyldimethylsilyl, or the like. In a case where the substituent group R is a bulky substituent group, $Cp^{R'}$ becomes bulky and causes steric hindrance when isoprene to be polymerized approaches the core metal M, thereby further facilitating an increase in vinyl bond content and a decrease in degree of branching in the resulting polyisoprene. Specific examples of $Cp^{R'}$ having a cyclopentadienyl ring as the base skeleton include compounds represented by the following structural formulae:

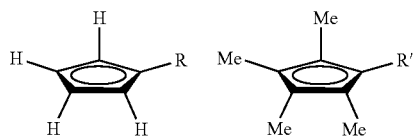

(In these structural formulae, R represents hydrocarbyl group or metalloid group, R' represents hydrogen atom, hydrocarbyl group or metalloid group.)

$Cp^{R'}$ (substituted indenyl) having an indenyl ring as the base skeleton, as well as preferable examples thereof, in general formula (III) is defined in the same manner as $Cp^R$ in general formula (I).

$Cp^{R'}$ (substituted fluorenyl) having a fluorenyl ring as the base skeleton in general formula (III) can be represented as $C_{13}H_{9-y}R_y$ or $C_{13}H_{17-y}R_y$.

In this regard, "y" is an integer in the range of 1 to 9 or 1 to 17, representing the number of substituent group R on the fluorenyl ring. "y" is preferably ≥2, i.e., it is preferable that the substituted fluorenyl has two or more substituent groups R, R. In a case where the substituted fluorenyl has two or more substituent groups R, R, then $Cp^{R'}$ becomes bulky and causes steric hindrance when isoprene approaches the core metal M, thereby facilitating an increase in vinyl bond content and a decrease in degree of branching in the resulting polyisoprene.

The substituent ring Rs preferably each independently represent hydrocarbyl or metalloid group. The number of carbon atoms of the hydrocarbyl group is preferably in the range of 1 to 20, more preferably in the range of 1 to 10, and further more preferably in the range of 1 to 8. Specifically, preferable examples of the hydrocarbyl group include methyl, ethyl, tert-butyl, phenyl, benzyl groups and the like. Examples of metalloid of the metalloid group include germyl Ge, stannyl Sn, and silyl Si. The metalloid group preferably includes a hydrocarbyl group which is defined in the same manner as the aforementioned hydrocarbyl group. Specific examples of the metalloid group include trimethylsilyl, tert-butyldimethylsilyl, and the like. Among these examples, at least one substituent group R is preferably a bulky substituent group such as phenyl, benzyl, tert-butyldimethylsilyl, or the like. In a case where the substituent group R is a bulky substituent group, $Cp^{R'}$ becomes bulky and causes steric hindrance when isoprene to be polymerized approaches the core metal M, thereby further facilitating an increase in vinyl bond content and a decrease in degree of branching in the resulting polyisoprene.

The core metal M in each of general formulae (I), (II) and (III) is a lanthanoid element, scandium or yttrium. The lanthanoid elements include fifteen elements having atomic numbers 57-71 and any of these elements is acceptable. Preferable examples of the core metal M include samarium Sm, neodymium Nd, praseodymium Pr, gadolinium Gd, cerium Ce, holmium Ho, scandium Sc, and yttrium Y. In this respect, a core metal M having a relatively small atomic radius is preferable. Use of a core metal M having a relatively small atomic radius facilitates an increase in vinyl bond content of the resulting polyisoprene. Among the examples of the core metal M described above, neodymium Nd, gadolinium Gd, and holmium Ho are preferable in terms of reactivity and gadolinium Gd and holmium Ho (holmium Ho, in particular) are preferable in terms of atomic radius.

The metallocene complex represented by general formula (I) includes a silylamide ligand [—N(SiR$_3$)$_2$]. R groups included in the silylamide ligand (i.e. $R^a$ to $R^f$ in general formula (I)) each independently represent a $C_{1-3}$ alkyl group or a hydrogen atom. It is preferable that at least one of $R^a$ to $R^f$ is a hydrogen atom. The catalyst can be easily synthesized and the surroundings of silicon lessen bulkiness such that isoprene can easily approach the core metal M from the silylamide ligand side, thereby facilitating an increase in vinyl bond content, when at least one of $R^a$ to $R^f$ is a hydrogen atom. For similar reasons, it is more preferable that at least one of $R^a$ to $R^c$ is a hydrogen atom and at least one of $R^d$ to $R^f$ is a hydrogen atom. Methyl group is preferable as the alkyl group.

The metallocene complex represented by general formula (II) includes a silyl ligand [—SiX'$_3$]. X' groups included in the silyl ligand [—SiX'$_3$], as well as preferable examples thereof, are defined in the same manner as X group in general formula (III) described below.

In general formula (III), X is selected from the group consisting of hydrogen atom, halogen atom, alkoxy group, thiolate group, amide group, silyl group, and a $C_{1-20}$ monovalent hydrocarbon group. Acceptable examples of the halogen atom represented by X in general formula (III) include fluorine, chlorine, bromine and iodine atoms. Chlorine or bromine atom is preferable, although any of the aforementioned four halogen atoms may be employed.

In general formula (III), examples of the alkoxy group represented by X include: aliphatic alkoxy group such as methoxy, ethoxy, propoxy, n-butoxy, isobutoxy, sec-butoxy, tert-butoxy, and the like; and aryloxy group such as phenoxy, 2,6-di-tert-butylphenoxy, 2,6-diisopropylphenoxy, 2,6-dineopentylphenoxy, 2-tert-butyl-6-isopropylphenoxy, 2-tert-butyl-6-neopentylphenoxy, 2-isopropyl-6-neopentylphenoxy, and the like. 2,6-di-tert-butylphenoxy is preferable as the alkoxy group among these examples.

Examples of the thiolate group represented by X in general formula (III) include: aliphatic thiolate group such as thiomethoxy, thioethoxy, thiopropoxy, n-thiobutoxy, thoisobutoxy, sec-thiobutoxy, tert-thiobutoxy, and the like; and arylthiolate group such as thiophenoxy, 2,6-di-tert-butylthiophenoxy, 2,6-diisopropylthiophenoxy, 2,6-dineopentylthiophenoxy, 2-tert-butyl-6-isopropylthiophenoxy, 2-tert-butyl-6-thioneopentylphenoxy, 2-isopropyl-6-thioneopentylphenoxy, 2,4,6-triisopropylthiophenoxy, and the like. 2,4,6-triisopropylthiophenoxy is preferable as the thiolate group among these examples.

Examples of the amide group represented by X in general formula (III) include: aliphatic amide group such as dimethylamide, diethylamide, diisopropylamide, and the like; arylamide group such as phenylamide, 2,6-di-tert-butylphenylamide, 2,6-diisopropylphenylamide, 2,6-dineopentylphenylamide, 2-tert-butyl-6-isopropylphenylamide, 2-tert-butyl-6-neopentylphenylamide, 2-isopropyl-6-neopentylphenylamide, 2,4,6-tri-tert-butylphenylamide, and the like; bis(trialkylsilyl)amide such as bis(trimethylsilyl)amide and the like; and bis(dialkylsilyl)amide such as bis(dimethylsilyl)amide and the like. Bis(trimethylsilyl)amide group and bis(dimethylsilyl)amide group are preferable as the amide group among these examples.

Examples of the silyl group represented by X in general formula (III) include trimethylsilyl, tris(trimethylsilyl)silyl, bis(trimethylsilyl)methylsilyl, trimethylsilyl(dimethyl)silyl, triisopropylsilyl(bistrimethylsilyl)silyl, and the like. Tris(trimethylsilyl)silyl is preferable as the silyl group among these examples.

Specific examples of the $C_{1-20}$ monovalent hydrocarbon group represented by X in general formula (III) include: normal/branched aliphatic hydrocarbon group such as methyl, ethyl, n-propyl, isopropyl, n-butyl, isobutyl, sec-butyl, tert-butyl, neopentyl, hexyl, octyl; aromatic hydrocarbon group such as phenyl, tolyl, naphthyl; aralkyl group such as benzyl; a hydrocarbon group containing silicon atom such as trimethylsilylmethyl, bis(trimethylsilyl)methyl; and the like. Methyl, ethyl, isobutyl, trimethylsilylmethyl, and the like are preferable as the $C_{1-20}$ monovalent hydrocarbon group among these examples.

Bis(trimethylsilyl)amide or bis(dimethylsilyl)amide or a $C_{1-20}$ monovalent hydrocarbon group is preferable as X in general formula (III).

Examples of the non-coordinating anion represented by [B]$^-$ in general formula (III) include quadrivalent boron anion. Specific examples of the quadrivalent boron anion include tetraphenylborate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl)borate, tetra(xylyl)borate, triphenyl (pentafluorophenyl)borate, [tris(pentafluorophenyl)phenyl]borate, tridecahydride-7,8-dicarbaundecaborate, and the like. Tetrakis(pentafluorophenyl)borate is preferable as the quadrivalent boron anion among these examples.

Each of the metallocene complexes represented by general formulae (I) and (II) and the half metallocene cation complex represented by general formula (III) further includes 0 to 3, preferably 0 to 1, neutral Lewis base L. Examples of the neutral Lewis base L include tetrahydrofuran, diethyl ether, dimethylaniline, trimethylphosphine, lithium chloride, neutral olefin, neutral diolefin, and the like. The neutral Lewis bases L may be of either the same type or different types when the complex includes a plurality of neutral Lewis bases L.

Each of the metallocene complexes represented by general formulae (I) and (II) and the half metallocene cation complex represented by general formula (III) may exist as any of monomer, dimer or another type of multimer.

The metallocene complex represented by general formulae (I) can be obtained by, for example, causing lanthanoid trishalide, scandium trishalide or yttrium trishalide to react with an indenyl salt (such as potassium or lithium indenyl salt) and a bis(trialkylsilyl)amide salt (such as potassium or lithium salt of bis(trialkylsilyl)amide) in a solvent. The reaction temperature may be set around the room temperature, which allows production in a mild condition. The reaction time may be set as desired and is generally in the range of a few hours to a few days. Type of the reaction solvent is not particularly limited but preferably a solvent capable of dissolving the raw materials and a reaction product. For example, toluene can be used. An example of a reaction for obtaining the metallocene complex represented by general formula (I) is shown below.

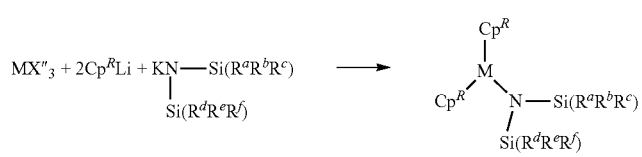

(I)

(In the reaction example above, X" represents a halide.)

The half metallocene cation complex represented by general formula (III) can be obtained, for example, by a reaction shown below.

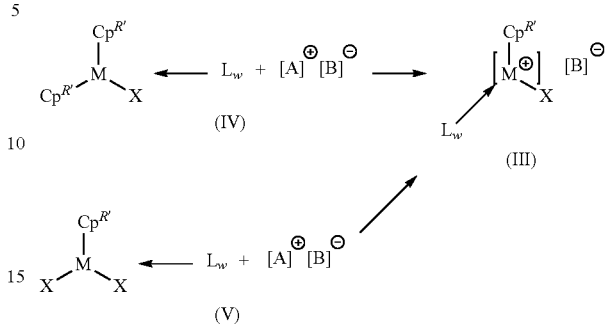

In the compound represented by general formula (IV) or general formula (V), M represents a lanthanoid element, scandium or yttrium; $Cp^{R'}$ or $Cp^{R'}$s each independently represent substituted cyclopentadienyl, substituted indenyl or substituted fluorenyl; and X or Xs each independently represent hydrogen atom, halogen atom, alkoxy, thiolate, amide, silyl, or a $C_{1-20}$ monovalent hydrocarbon group. L represents a neutral Lewis base and w represents an integer in the range of 0 to 3. $[A]^+$ represents a cation and $[B]^-$ represents a non-coordinating anion in an ionic compound represented by $[A]^+[B]^-$.

(In the reaction example above, X" represents a halide.)

The metallocene complex represented by general formulae (II) can be obtained by, for example, causing lanthanoid trishalide, scandium trishalide or yttrium trishalide to react with an indenyl salt (such as potassium or lithium indenyl salt) and a silyl salt (such as potassium or lithium silyl salt) in a solvent. The reaction temperature may be set around the room temperature, which allows production in a mild condition. The reaction time may be set as desired and is generally in the range of a few hours to a few days. Type of the reaction solvent is not particularly limited but preferably a solvent capable of dissolving the raw materials and a reaction product. For example, toluene can be used. An example of a reaction for obtaining the metallocene complex represented by general formula (II) is shown below.

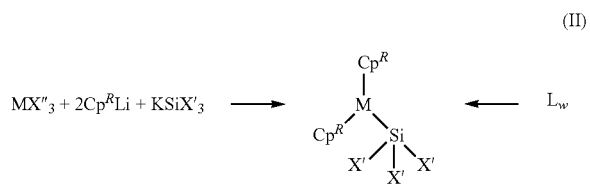

(II)

Examples of the cation represented by $[A]^+$ include carbonium cation, oxonium cation, amine cation, phosphonium cation, cycloheptatrienyl cation, ferrocenium cation having transition metal, and the like. Examples of the carbonium cation include trisubstituted carbonium cation such as triphenylcarbo(e)nium cation (which may occasionally be referred to as "trityl cation"), tri(substituted phenyl)carbonium cation, and the like. Specific examples of the tri(substituted phenyl)carbonium cation include tri(methylphenyl)carbonium cation. Examples of the amine cation include: trialkylammonium cation such as trimethylammonium cation, triethylammonium cation, tripropylammonium cation, tributylammonium cation; N,N-dialkylanilinium cation such as N,N-dimethylanilinium cation, N,N-diethylanilinium cation, N,N-2,4,6-pentamethylanilinium cation; dialkylammonium cation such as diisopropylammonium cation, dicyclohexylammonium cation; and the like. Examples of the phosphonium cation include triarylphosphonium cation such as triphenylphosphonium cation, tri(methylphenyl)phosphonium cation, tri(dimethylphenyl)phosphonium cation, and the like. N,N-dialkylanilinium cation or carbonium cation is preferable and N,N-dialkylanilinium cation is particularly preferable as $[A]^+$ among these examples.

The ionic compound represented by general formula $[A]^+[B]^-$ for use in the aforementioned reaction is, for example, a compound obtained by combining a non-coordinating anion and a cation respectively selected from the aforementioned examples and preferably N,N-dimethylanilinium tetrakis(pentafluorophenyl)borate, triphenylcarbonium tetrakis(pentafluorophenyl)borate (which may occasionally be referred to as "trityl tetrakis(pentafluorophenyl) borate"), and the like. The ionic compound represented by general formula $[A]^+[B]^-$ is added to the compounds represented by general formula (IV) or general formula (V) by an amount preferably 0.1 to 10 times, more preferably approximately 1 times, as much as the amount of the compounds represented by general formula (IV) or general formula (V) when compared in mol. In the case where the half metallocene cation complex represented by general formula (III) is used for a polymerization reaction, the half metallocene cation complex represented by general formula (III) may be directly provided into a polymerization reaction system or, alternatively, the half metallocene cation complex represented by general formula (III) may be formed in a polymerization reaction system by providing a compound represented by general formula (IV) or general formula (V) and the ionic compound represented by general formula $[A]^+[B]^-$ for use in the aforementioned reaction, respectively, in the polymerization reaction system. Further alternatively, the half metallocene cation complex represented by general formula (III) may be formed in a polymerization reaction system by using the metallocene complex represented by general formula (I) or general formula (II) and the ionic compound represented by general formula $[A]^+[B]^-$ in a combined manner in the polymerization reaction system.

Each of the structures of the metallocene complex represented by general formula (I) or general formula (II) and the half metallocene cation complex represented by general formula (III) can be determined through x-ray structural analysis.

The prompter applicable to the polymerization catalyst composition can be selected according to necessity from components used as prompters for a conventional polymerization catalyst composition containing a metallocene complex. Preferable examples of the prompter include aluminoxane, an organic aluminum compound, the ionic compounds described above, and the like. Either a single type or combination of two or more types of these examples may be used as the prompter.

The aforementioned aluminoxane is preferably alkylaluminoxane and examples thereof include methylaluminoxane (MAO), modified methylaluminoxane, and the like. "MMAO-3A" (manufactured by Tosoh Finechem Corporation) or the like is preferable as the modified methylaluminoxane. Provided that "Al/M" represents an element ratio of the aluminum element Al of the aluminoxane with respect to the core metal M of the metallocene complex or the half metallocene cation complex, the content of the aluminoxane in the polymerization catalyst composition is preferably set such that the element ratio Al/M is in the range of 10 to 1000 approximately, desirably around 100.

On the other hand, the aforementioned organic aluminum compound is preferably an organic aluminum compound represented by general formula $AlR^1R^2R^3$ (in the formula, $R^1$ and $R^2$ each independently represent a $C_{1-10}$ hydrocarbon group or a hydrogen atom and $R^3$ represents a $C_{1-10}$ hydrocarbon group). Examples of the organic aluminum compound include trialkylaluminum, dialkylaluminum hydride, and the like. Trialkylaluminum is preferable as the organic aluminum compound among these examples. Examples of trialkylaluminum include triethylaluminum, triisobutylaluminum, and the like. Examples of dialkylaluminum hydride include diisobutylaluminum hydride, and the like. A content of the organic aluminum compound in the polymerization catalyst composition is preferably 1 to 50 times, more preferably around 10 times, as much as the content of the metallocene complex or the half metallocene cation complex in the composition when compared in mol.

The vinyl bond content and/or the molecular weight of a resulting polyisoprene can be increased by using each of the metallocene complex represented by general formula (I) and/or the metallocene complex represented by general formula (II) and/or the half metallocene cation complex represented by general formula (III) with an appropriate prompter in combination in the polymerization catalyst composition.

It is preferable that the polymerization catalyst composition contains no halogen compound. Conventionally, a halogen compound such as dialkylaluminum chloride, alkylaluminum dichloride or the like is often used when an organic aluminum compound is employed as a prompter in a polymerization reaction using a metallocene complex or a half metallocene cation complex. However, in the present disclosure, an increase in vinyl bond content in the resulting polyisoprene tends to be facilitated by not employing a halogen compound in the polymerization catalyst composition.

The polyisoprene of the present disclosure can be manufactured by a process of polymerizing isoprene under the presence of the polymerization catalyst composition described above (which polymerizing process will simply be referred to as the "polymerization process" hereinafter). The isoprene manufacturing process may further include other processes such as coupling process and rinsing process, according to necessity.

Any polymerization method such as solution polymerization, suspension polymerization, liquid-phase bulk polymerization, emulsion polymerization, vapor-phase polymerization, or solid-phase polymerization can be used as the polymerization method in the polymerization process. In a case where a solvent is used in the polymerization reaction, any solvent is acceptable as long as the solvent is inactive in the polymerization reaction. Examples of the solvent include toluene, hexane (e.g. cyclohexane, n-hexane), and the like. Hexane is preferable among the examples. Environmental burden can be reduced by using hexane as a solvent in the polymerization.

It is possible, under the presence of the polymerization catalyst composition, to control bond contents (cis-1,4 bond content, trans-1,4 bond content, 3,4 vinyl bond content, and 1,2 vinyl bond content) in the resulting polyisoprene by controllably changing the reaction conditions.

The polymerization reaction is preferably carried out in an atmosphere of inert gas, desirably in an atmosphere of nitrogen gas or argon gas in the polymerization process. The polymerization temperature in the polymerization reaction, although it is not particularly restricted, is preferably in the range of −100° C. to 200° C. and may be around the room temperature, for example. Pressure during the polymerization reaction is preferably in the range of 0.1 MPa to 10.0 MPa. Reaction time of the polymerization reaction is preferably in the range of 1 second to 10 days, for example, although it is not particularly restricted. The reaction time may be appropriately set depending on conditions such as a micro structure desired for the resulting polyisoprene, type of the catalyst, the polymerization temperature, and the like.

The polymerization reaction can be stopped by using a polymerization terminator such as methanol, ethanol, isopropanol in the polymerization process.

The coupling process is a process of carrying out a reaction (a coupling reaction) for modifying at least a portion, e.g., a terminal end, of a polyisoprene obtained by the polymerization process described above.

In the coupling process, the coupling reaction is preferably carried out when a conversion ratio in the polymerization reaction has reached 100%.

Type of a coupling agent for use in the coupling reaction is not particularly restricted and can be appropriately selected according to the purpose. Examples of the coupling agent include: (i) a tin-containing compound such as bis(maleic acid-1-octadecyl)dioctyl tin (IV); (ii) an isocyanate compound such as 4,4'-diphenylmethane diisocyanate; (iii) an alkoxysilane compound such as glycidyl propyltrimethoxysilane; and the like. Either a single type or combination of two or more types of these examples may be used as the coupling agent. Bis(maleic acid-1-octadecyl)dioctyl tin (IV) is preferable as the coupling agent among these examples in terms of high reaction efficiency and relatively little gel generation.

It is possible to increase the number-average molecular weight (Mn), the weight-average molecular weight (Mw), and the weight-average absolute molecular weight (Mw') of the resulting polyisoprene by carrying out a coupling reaction.

The rinsing process is a process of rinsing a polyisoprene obtained by the aforementioned polymerization process. Type of a medium for use in the rinsing process is not particularly restricted and can be appropriately selected according to the purpose. Examples of the medium include methanol, ethanol, isopropanol, and the like. An acid (such as hydrochloric acid, sulfuric acid, nitric acid) may be added to such a medium or solvent as described above in use. An amount to be added, of the acid, is preferably 15 mol % or less with respect to the solvent. Addition of the acid by an amount exceeding 15 mol % with respect to the solvent may cause the acid to remain in the polyisoprene, possibly adversely affecting mixture and kneading processes and a vulcanization reaction.

An amount of catalyst residue in the polyisoprene can be decreased to an appropriate level by the rinsing process.

<Rubber Composition>

A rubber composition of the present disclosure characteristically contains the polyisoprene described above. The rubber composition of the present disclosure exhibits relatively small hysteresis loss and successfully decreases rolling resistance and improves the fuel-saving performance of a tire when the rubber composition is used for the tire. Further, the rubber composition of the present disclosure, when it is used for a tire, can also improve grip performance on a wet road surface of the tire.

The rubber composition of the present disclosure contains the aforementioned polyisoprene as a rubber component and optionally may further contain other rubber components, a filler, a crosslinking agent and other components.

In the rubber composition of the present disclosure, a content of the polyisoprene in the rubber component is preferably in the range of 10 to 100 mass %, more preferably in the range of 20 to 100 mass %, and still more preferably in the range of 30 to 100 mass %. The polyisoprene content in the rubber component, of 10 mass %, ensures full demonstration of an effect caused by the polyisoprene, thereby further decreasing hysteresis loss of the rubber composition, and further improves the fuel-saving performance and grip performance on a wet road surface, of a tire, when the rubber composition is used for the tire.

Types of rubber components other than the polyisoprene of the present disclosure are not particularly restricted and can be appropriately selected according to the purpose. Examples of other rubber components include natural rubber (NR), polybutadiene rubber (BR), acrylonitrile-butadiene rubber (NBR), chloroprene rubber, ethylene-propylene rubber (EPM), ethylene-propylene-nonconjugated diene rubber (EPDM), polysulfide rubber, silicone rubber, fluororubber, urethane rubber, and the like. Either a single type or combination of two or more types of these examples may be used as the other rubber components.

The rubber composition can improve reinforcing properties thereof by including a filler therein. Type of the filler is not particularly restricted and examples thereof include carbon black, silica, aluminum hydroxide, clay, alumina, talc, mica, kaolin, glass balloons, glass beads, calcium carbonate, magnesium carbonate, magnesium hydroxide, magnesium oxide, titanium oxide, potassium titanate, barium sulfate, and the like. Carbon black is preferably used among these examples. Either a single type or combination of two or more types of these examples may be used as the filler.

A content of the filler, although it is not particularly restricted and appropriately selected according to the purpose, is preferably 10 to 100 parts by mass, more preferably 20 to 80 parts by mass, and most preferably 30 to 60 parts by mass, with respect to 100 parts by mass of the rubber component. The content of the filler, of $\geq 10$ parts by mass with respect to 100 parts by mass of the rubber component, ensures an effect of improving the reinforcing property of the rubber composition by the filler. The content of the filler, of $\leq 100$ parts by mass with respect to 100 parts by mass of the rubber component, ensures good workability of the rubber composition.

Type of the crosslinking agent is not particularly restricted and can be appropriately selected according to the purpose. Examples of the crosslinking agent include sulfur-based crosslinking agent, organic peroxide-based crosslinking agent, inorganic crosslinking agent, polyamine crosslinking agent, resin crosslinking agent, sulfur compound-based crosslinking agent, oxime-nitrosamine-based crosslinking agent, and the like. Sulfur-based crosslinking agent (vulcanizing agent) is preferably applied to a rubber composition for a tire among these examples.

A content of the crosslinking agent is not particularly restricted and can be appropriately selected according to the purpose but is preferably in the range of 0.1 to 10 parts by mass with respect to 100 parts by mass of the rubber component.

When a vulcanizing agent is employed, a vulcanization accelerator may be used in combination with the vulcanizing agent. Examples of the vulcanization accelerator include guanidine based, aldehyde-amine based, aldehyde-ammonium based, thiazole based, sulfenamide based, thiourea based, thiuram based, dithiocarbamate based, xanthate based compounds, and the like.

Further, other known additives such as a softener, a vulcanization accelerator aid, a coloring agent, a fire retardant, a lubricant, a foaming agent, a plasticizer, a processing aid, an antioxidant, an antiaging agent, a scorch protection agent, a UV protection agent, an antistatic agent, an anticoloring agent, and the like may optionally be used in the rubber composition of the present disclosure according to the necessity.

The rubber composition of the present disclosure is applicable to, other than a tire described below, a rubber damper, quake-absorbing rubber, a belt such as a conveyor belt, a rubber crawler, hoses of various types, and the like.

<Tire>

A tire of the present disclosure characteristically employs the rubber composition described above. Precisely, the tire of the present disclosure includes vulcanized rubber obtained by vulcanizing the rubber composition described above. The tire of the present disclosure, thus manufactured, exhibits low rolling resistance and is excellent in the fuel-saving performance. Further, the tire of the present disclosure is excellent in grip performance on a wet road surface thereof, as well.

A portion of a tire to which the rubber composition of the present disclosure is to be applied is not particularly limited and the tire portion can be appropriately selected according to the purpose. Examples of the tire portion include a tread, a base tread, a sidewall, side reinforcing rubber, a bead filler, and the like.

The tire of the present disclosure can be manufactured by a conventional method. For example, a desired tire (such as a pneumatic tire) can be manufactured by: sequentially laminating members generally for use in tire production such as a carcass layer, a belt layer, a tread layer made of the unvulcanized rubber composition and/or cords on a tire building drum; removing the drum, to obtain a green tire; and subjecting the green tire to heating and vulcanization according to the conventional method.

EXAMPLES

The present disclosure will be described further in detail by Examples hereinafter. The present disclosure is not restricted by any means by these Examples.

Example 1

A polymer (polyisoprene) was prepared by: charging 35 g of toluene and 460 g of a toluene solution containing 100 g of isoprene into a thoroughly dry 1 L pressure-resistant glass reactor;

charging, on the other hand, 0.005 mmol of mono(1,3-bis(tert-butyldimethylsilyl)indenyl) gadolinium bis(bis(dimethylsilyl)amide) complex $\{1,3\text{-}[(t\text{-Bu})Me_2Si]_2C_9H_5Gd[N(SiHMe_2)_2]_2\}$, 0.005 mmol of trityl tetrakis(pentafluorophenyl)borate $[Ph_3CB(C_6F_5)_4]$, 0.1 mmol of triisobutylaluminum, and 1.9 mmol of diisobutylaluminum hydride into a glass vessel in a glovebox under nitrogen atmosphere and dissolving the substances in 5 mL of toluene, to obtain a catalyst solution;

adding the catalyst solution thus obtained, to the 1 L pressure-resistant glass reactor, and allowing a reaction to proceed for 300 minutes at 50° C.;

then stopping the reaction by adding an isopropanol solution (1 mL) of 5 mass % 2,2'-methylene-bis(4-ethyl-6-tert-butylphenol) (NS-5) to the 1 L pressure-resistant glass reactor; and isolating a polymer by using a large amount of methanol and vacuum-drying the resulting polymer at 50° C., thereby obtaining 96 g of the polymer (polyisoprene) of Example 1.

Example 2

A polymer (polyisoprene) was prepared by: charging 31 g of toluene and 461 g of a toluene solution containing 100 g of isoprene into a thoroughly dry 1 L pressure-resistant glass reactor;

charging, on the other hand, 0.010 mmol of mono(1,3-bis(tert-butyldimethylsilyl)indenyl) holmium bis(bis(dimethylsilyl)amide) complex $\{1,3\text{-}[(t\text{-Bu})Me_2Si]_2C_9H_5Ho[N(SiHMe_2)_2]_2\}$, 0.010 mmol of trityl tetrakis(pentafluorophenyl)borate $[Ph_3CB(C_6F_5)_4]$, 0.20 mmol of triisobutylaluminum, and 1.8 mmol of diisobutylaluminum hydride into a glass vessel in a glovebox under nitrogen atmosphere and dissolving the substances in 5 mL of toluene, to obtain a catalyst solution;

adding the catalyst solution thus obtained, to the 1 L pressure-resistant glass reactor, and allowing a reaction to proceed for 900 minutes at 50° C.;

then stopping the reaction by adding an isopropanol solution (1 mL) of 5 mass % 2,2'-methylene-bis(4-ethyl-6-tert-butylphenol) (NS-5) to the 1 L pressure-resistant glass reactor; and isolating a polymer by using a large amount of methanol and vacuum-drying the resulting polymer at 50° C., thereby obtaining 90 g of the polymer (polyisoprene) of Example 2.1

Example 3

A polymer (polyisoprene) was prepared by: charging 36 g of toluene and 576 g of a toluene solution containing 125 g of isoprene into a thoroughly dry 1 L pressure-resistant glass reactor;

charging, on the other hand, 0.015 mmol of mono(1,3-bis(tert-butyldimethylsilyl)indenyl) holmium bis(bis(dimethylsilyl)amide) complex $\{1,3\text{-}[(t\text{-Bu})Me_2Si]_2C_9H_5Ho[N(SiHMe_2)_2]_2\}$, 0.015 mmol of trityl tetrakis(pentafluorophenyl)borate $[Ph_3CB(C_6F_5)_4]$, 0.30 mmol of triisobutylaluminum, and 6.0 mmol of diisobutylaluminum hydride into a glass vessel in a glovebox under nitrogen atmosphere and dissolving the substances in 5 mL of toluene, to obtain a catalyst solution;

adding the catalyst solution thus obtained, to the 1 L pressure-resistant glass reactor, and allowing a reaction to proceed for 900 minutes at 50° C.;

then stopping the reaction by adding an isopropanol solution (1 mL) of 5 mass % 2,2'-methylene-bis(4-ethyl-6-tert-butylphenol) (NS-5) to the 1 L pressure-resistant glass reactor; and isolating a polymer by using a large amount of methanol and vacuum-drying the resulting polymer at 50° C., thereby obtaining 108 g of the polymer (polyisoprene) of Example 3.

Example 4

A polymer (polyisoprene) was prepared by: charging 38 g of toluene and 576 g of a toluene solution containing 125 g of isoprene into a thoroughly dry 1 L pressure-resistant glass reactor;

charging, on the other hand, 0.0125 mmol of mono(1,3-bis(tert-butyldimethylsilyl)indenyl) holmium bis(bis(dimethylsilyl)amide) complex $\{1,3\text{-}[(t\text{-Bu})Me_2Si]_2C_9H_5Ho[N(SiHMe_2)_2]_2\}$, 0.0125 mmol of trityl tetrakis(pentafluorophenyl)borate $[Ph_3CB(C_6F_5)_4]$, 0.25 mmol of triisobutylaluminum, and 6.0 mmol of diisobutylaluminum hydride into a glass vessel in a glovebox under nitrogen atmosphere and dissolving the substances in 5 mL of toluene, to obtain a catalyst solution;

adding the catalyst solution thus obtained, to the 1 L pressure-resistant glass reactor, and allowing a reaction to proceed for 900 minutes at 50° C.;

then stopping the reaction by adding an isopropanol solution (1 mL) of 5 mass % 2,2'-methylene-bis(4-ethyl-6-tert-butylphenol) (NS-5) to the 1 L pressure-resistant glass reactor; and isolating a polymer by using a large amount of methanol and vacuum-drying the resulting polymer at 50° C., thereby obtaining 89 g of the polymer (polyisoprene) of Example 4.

Example 5

A polymer (polyisoprene) was prepared by: charging 34 g of toluene and 460 g of a toluene solution containing 100 g of isoprene into a thoroughly dry 1 L pressure-resistant glass reactor;

charging, on the other hand, 0.010 mmol of mono(1,3-bis(tert-butyldimethylsilyl)indenyl) gadolinium bis(bis (dimethylsilyl)amide) complex {1,3-[(t-Bu) Me$_2$Si]$_2$C$_9$H$_5$Gd[N(SiHMe$_2$)$_2$]$_2$}, 0.010 mmol of trityl tetrakis(pentafluorophenyl)borate [Ph$_3$CB(C$_6$F$_5$)$_4$], 0.20 mmol of triisobutylaluminum, and 1.5 mmol of diisobutylaluminum hydride into a glass vessel in a glovebox under nitrogen atmosphere and dissolving the substances in 5 mL of toluene, to obtain a catalyst solution;

adding the catalyst solution thus obtained, to the 1 L pressure-resistant glass reactor, and allowing a reaction to proceed for 240 minutes at the room temperature;

then stopping the reaction by adding an isopropanol solution (1 mL) of 5 mass % 2,2'-methylene-bis(4-ethyl-6-tert-butylphenol) (NS-5) to the 1 L pressure-resistant glass reactor; and isolating a polymer by using a large amount of methanol and vacuum-drying the resulting polymer at 50° C., thereby obtaining 95 g of the polymer (polyisoprene) of Example 5.

Example 6

A polymer (polyisoprene) was prepared by: charging 34 g of toluene and 460 g of a toluene solution containing 100 g of isoprene into a thoroughly dry 1 L pressure-resistant glass reactor;

charging, on the other hand, 0.010 mmol of mono(1,3-bis(tert-butyldimethylsilyl)indenyl) gadolinium bis(bis (dimethylsilyl)amide) complex {1,3-[(t-Bu) Me$_2$Si]$_2$C$_9$H$_5$Gd[N(SiHMe$_2$)$_2$]$_2$}, 0.010 mmol of trityl tetrakis(pentafluorophenyl)borate [Ph$_3$CB(C$_6$F$_5$)$_4$], 0.20 mmol of triisobutylaluminum, and 0.15 mmol of diisobutylaluminum hydride into a glass vessel in a glovebox under nitrogen atmosphere and dissolving the substances in 5 mL of toluene, to obtain a catalyst solution;

adding the catalyst solution thus obtained, to the 1 L pressure-resistant glass reactor, and allowing a reaction to proceed for 900 minutes at the room temperature;

then stopping the reaction by adding an isopropanol solution (1 mL) of 5 mass % 2,2'-methylene-bis(4-ethyl-6-tert-butylphenol) (NS-5) to the 1 L pressure-resistant glass reactor; and isolating a polymer by using a large amount of methanol and vacuum-drying the resulting polymer at 50° C., thereby obtaining 99 g of the polymer (polyisoprene) of Example 6.

<Analysis of Polymers>

The weight-average molecular weight (Mw), the number-average molecular weight (Mn) and the molecular weight distribution (Mw/Mn) in terms of polystyrene, the weight-average absolute molecular weight (Mw'), the branching index treated by the weight average (the $g_w$ value), the vinyl bond content (1,2-vinyl bond content, 3,4-vinyl bond content), and the glass transition temperature (Tg) were measured for each of the polymers thus obtained, by the methods described below. The results are shown in Table 1.

(1) Weight-Average Molecular Weight (Mw), Number-Average Molecular Weight (Mn) and Molecular Weight Distribution (Mw/Mn) in Terms of Polystyrene The weight-average molecular weight (Mw), the number-average molecular weight (Mn) and the molecular weight distribution (Mw/Mn) in terms of polystyrene were determined, respectively, for each of the polymers thus obtained, relative to monodisperse polystyrene as a standard reference material, by using gel permeation chromatography [GPC: HLC-8320GPC manufactured by Tosoh Corporation, Column: GMH$_{HL}$×2 manufactured by Tosoh Corporation, Detector: a differential refractive index detector (RI)]. The measurement temperature was 40° C., the measurement flow rate was 1 mL/minute, the mobile phase was tetrahydrofuran (THF), the concentration of the analyte solution was 1 mg/mL, and the injected amount was 100 μL.

(2) Weight-Average Absolute Molecular Weight (Mw'), Branching Index Treated by the Weight Average ($g_w$ Value)

The weight-average absolute molecular weight (Mw') was determined for each of the polymers thus obtained, by using gel permeation chromatography [GPC: HLC-8320GPC manufactured by Tosoh Corporation, Column: GMH$_{HL}$×2 manufactured by Tosoh Corporation, Detector: a differential refractive index detector (RI)] and a multi-angle light scattering detector (MALS: "Dawn Heleos II" manufactured by Wyatt Technology Corporation). Further, the branching index (the g value) was determined from the root-mean-square (<Rg$^2$>) of a radius of gyration of the polymer and then the branching index treated by the weight average (the $g_w$ value) was calculated by subjecting the branching index (the g value) to weighting by the weight average.

(3) Vinyl Bond Content (1,2-Vinyl Bond Content, 3,4-Vinyl Bond Content)

An NMR spectrum was obtained for each of the polymers thus prepared, by using an NMR ("AVANCE 600" manufactured by Bruker Analytik Gmbh). A 1,2-vinyl bond content and a 3,4-vinyl bond content were calculated, respectively, from the integration ratios of the peaks including: ($^1$H-NMR: δ 4.6-4.8 (=CH$_2$ of 3,4-vinyl unit), 5.0-5.2 (—CH= of 1,4-unit), 5.6-5.8 (—CH= of 1,2-unit), 4.8-4.9 (=CH$_2$ of 1,2-unit); and $^{13}$C-NMR: δ 23.4 (1,4-cis unit), 15.9 (1,4-trans unit), 18.6 (3,4-unit)) obtained by the measurement of $^1$H-NMR and $^{13}$C-NMR. The vinyl bond content of the polymer was calculated as the sum of the 1,2-vinyl bond content and the 3,4-vinyl bond content.

(4) Glass Transition Temperature (Tg)

The glass transition temperature (Tg) was measured for each of the polymers thus obtained, according to JIS K 7121-1987, by using a differential scanning calorimeter (DSC) "DSCQ2000" manufactured by TA Instruments Japan.

Comparative Example 1

The weight-average molecular weight (Mw), the number-average molecular weight (Mn) and the molecular weight distribution (Mw/Mn) in terms of polystyrene, the weight-average absolute molecular weight (Mw'), the branching index treated by the weight average (the $g_w$ value), the vinyl bond content (1,2-vinyl bond content, 3,4-vinyl bond content), and the glass transition temperature (Tg) were measured, respectively, for the product name "Isogrip" manufactured by KARBOCHEM Ltd. by the methods described above. The results are shown in Table 1.

TABLE 1

|  |  | Comp. Example 1 | Example 1 | Example 2 | Example 3 | Example 4 | Example 5 | Example 6 |
|---|---|---|---|---|---|---|---|---|
| Weight-average molecular weight in terms of polystyrene (Mw) | ×$10^3$ | 740 | 460 | 510 | 680 | 790 | 370 | 1340 |
| Number-average molecular weight in terms of polystyrene (Mn) | ×$10^3$ | 300 | 240 | 210 | 270 | 310 | 170 | 700 |
| Molecular weight distribution (Mw/Mn) | — | 2.50 | 1.90 | 2.40 | 2.50 | 2.60 | 2.18 | 1.91 |
| Weight-average absolute molecular weight (Mw') | ×$10^3$ | 635 | 334 | 393 | 504 | 574 | 268 | 792 |
| Weight-average absolute molecular weight (Mw')/Weight-average molecular weight in terms of polystyrene (Mw) | — | 0.858 | 0.726 | 0.771 | 0.741 | 0.727 | 0.724 | 0.591 |
| Branching index ($g_w$ value) treated by the weight average | — | 0.41 | 0.44 | 0.47 | 0.50 | 0.47 | 0.44 | 0.58 |
| Vinyl bond content | mol % | 59 | 58 | 67 | 75 | 75 | 56 | 56 |
| 1,2-vinyl bond content | mol % | 2.1 | 0 | 0 | 0 | 0 | 0 | 0 |
| 3,4-vinyl bond content | mol % | 57 | 58 | 67 | 75 | 75 | 56 | 56 |
| Glass transition temperature | ° C. | −11 | −17 | −6 | −2 | 2 | −17 | −17 |

It is understood from Table 1 that the commercially available polyisoprene of Comparative Example 1, although it has a high vinyl bond content, exhibits a ratio of the weight-average absolute molecular weight with respect to the weight-average molecular weight in terms of polystyrene [(weight-average absolute molecular weight (Mw'))/(weight-average molecular weight in terms of polystyrene (Mw))] exceeding 0.850, thereby indicating a high degree of branching thereof.

In contrast, the polyisoprene according to the present disclosure has a vinyl bond content of ≥30 mol % and a ratio of the weight-average absolute molecular weight with respect to the weight-average molecular weight in terms of polystyrene [(weight-average absolute molecular weight (Mw'))/(weight-average molecular weight in terms of polystyrene (Mw))] of 0.850, thereby indicating a low degree of branching thereof.

<Preparation of Rubber Composition and Evaluation Thereof>

Rubber composition samples were manufactured by using a conventional Banbury mixer according to the blend formulation shown in Table 2. The rubber composition samples thus obtained were subjected to vulcanization at 145° C. for 33 minutes, respectively, whereby vulcanized rubber test pieces were prepared. Each of the vulcanized rubber test pieces was evaluated for the fuel-saving performance and grip performance on a wet road surface thereof by the methods described below. The results are shown in Table 3.

(5) Fuel-Saving Performance

Tan δ (loss tangent) at 50° C. was measured for each of the vulcanized rubber test pieces by using "ARESG2" manufactured by TA Instruments Japan under the conditions of strain: 0.1% to 30% and frequency: 15 Hz. The tan δ value thus measured was converted to the multiplicative inverse thereof and then the multiplicative inverse was expressed, as the fuel-saving performance, by an index relative to the multiplicative inverse of tan δ at strain: 10% of Comparative Example 2 being "100". The larger index represents the smaller tan δ (i.e., the lower hysteresis loss) and thus the better fuel-saving performance.

(6) Grip Performance on Wet Road Surface

Each of the vulcanized rubber test pieces was rubbed against a wet road surface and resistance experienced by the test piece was measured by using a British portable skid resistance tester (BPST) at 23° C. The resistance value thus measured was expressed by an index relative to the resistance value of Comp. Example 2 being "100". The larger index value represents the larger resistance and thus the better grip performance on a wet road surface.

TABLE 2

| Blend formulation | Parts by mass |
|---|---|
| Rubber component *1 | 100 |
| Silica *2 | 55 |
| aromatic oil *3 | 10 |
| Silane coupling agent *4 | 4.4 |
| Stearic acid | 2 |
| Wax *5 | 2 |
| Antioxidant *6 | 1 |
| Sulfur | 1.2 |
| Vulcanization accelerator DPG *7 | 1.12 |
| Vulcanization accelerator DM *8 | 1.6 |
| Vulcanization accelerator NS *9 | 0.56 |
| Zinc white | 2.5 |

*1 Rubber component: the rubber components used in Comp. Examples 2, 3 and Examples 7, 8 are shown in Table 3, respectively.
*2 Silica: product name "Nipsil AQ" manufactured by Toso Silica Corporation
*3 Aromatic oil: product name "AROMAX #3" manufactured by Fuji Kosan Co., Ltd.
*4 Silane coupling agent: bis(3-triethoxysilylpropyl)disulfide (the average sulfur chain length: 2.35), product name "Si75 ®" manufactured by Evonic Industries, AG
*5 Wax: microcrystalline wax, manufactured by Seiko Chemical Co., Ltd.
*6 Antioxidant: N-(1,3-dimethylbutyl)-N'-phenyl-p-phenylenediamine, product name "Nocrac 6C" manufactured by Ouchi-Shinko Chemical Industrial Co., Ltd.
*7 Vulcanization accelerator DPG: 1,3-diphenylguanidine, product name "Sanceler D" manufactured by SANSHIN CHEMICAL INDUSTRY CO., LTD.
*8 Vulcanization accelerator DM: di-2-benzothiazolyl disulfide, product name "Sanceler DM" manufactured by SANSHIN CHEMICAL INDUSTRY CO., LTD.
*9 Vulcanization accelerator NS: N-tert-butyl-2-benzothiazolylsulphenamide, product name "Sanceler NS" manufactured by SANSHIN CHEMICAL INDUSTRY CO., LTD.

TABLE 3

|  |  |  | Comp. Example 2 | Comp. Example 3 | Example 7 | Example 8 |
|---|---|---|---|---|---|---|
| Types of rubber component |  |  | SBR *10 | Polyisoprene of Comp. Example 1 | Polyisoprene of Example 5 | Polyisoprene of Example 6 |
| Evaluation | Fuel-saving performance | Index | 100 | 82 | 86 | 101 |
|  | Grip performance on wet road surface | Index | 100 | 121 | 124 | 132 |

TABLE 3-continued

|  |  | Comp. Example 2 | Comp. Example 3 | Example 7 | Example 8 |
|---|---|---|---|---|---|
| Fuel-saving performance index + Grip performance on wet road surface index | Index | 200 | 203 | 210 | 233 |

*10 SBR: product name "#1500" manufactured by JSR Corporation, the weight-average molecular weight (Mw) in terms of polystyrene = 519 × 10$^3$, the number-average molecular weight (Mn) in terms of polystyrene = 150 × 10$^3$, the molecular weight distribution (Mw/Mn) = 3.46, the content of styrene bond = 23.5 mass %, the vinyl bond content in butadiene portions = 16 mol %, the glass transition temperature (Tg) = −56° C.

It is understood from Table 3 that the rubber compositions of Examples, containing the polyisoprene according to the present disclosure, respectively, are excellent in the fuel-saving performance and grip performance on a wet road surface, as compared with each of the rubber compositions containing the conventional polyisoprene.

INDUSTRIAL APPLICABILITY

The polyisoprene of the present disclosure is applicable to a rubber composition as a rubber component thereof. The rubber composition of the present disclosure is applicable to various types of rubber articles including a tire. The tire of the present disclosure is applicable to various types of vehicles as a tire thereof.

The invention claimed is:

1. Polyisoprene, characterized in that:
a vinyl bond content of the polyisoprene is 30 mol % or higher;
the number-average molecular weight in terms of polystyrene (Mn) is in the range of 125,000 to 1,500,000, and
a ratio of the weight-average absolute molecular weight determined by GPC-MALS with respect to the weight-average molecular weight in terms of polystyrene determined by GPC [(weight-average absolute molecular weight)/(weight-average molecular weight in terms of polystyrene)] is 0.850 or less.

2. The polyisoprene of claim 1, wherein a branching index ($g_w$ value) determined by GPC-MALS and treated by the weight average is 0.42 or higher.

3. The polyisoprene of claim 1, wherein the vinyl bond content of the polyisoprene is 50 mol % or higher.

4. The polyisoprene of claim 1, wherein a 1,2-vinyl bond content of the polyisoprene is 1 mol % or less.

5. A rubber composition, characterized in that it contains the polyisoprene of claim 1.

6. A tire, characterized in that it uses the rubber composition of claim 5.

7. The polyisoprene of claim 2, wherein the vinyl bond content of the polyisoprene is 50 mol % or higher.

8. The polyisoprene of claim 2, wherein a 1,2-vinyl bond content of the polyisoprene is 1 mol % or less.

9. A rubber composition, characterized in that it contains the polyisoprene of claim 2.

10. The polyisoprene of claim 3, wherein a 1,2-vinyl bond content of the polyisoprene is 1 mol % or less.

11. A rubber composition, characterized in that it contains the polyisoprene of claim 3.

12. A rubber composition, characterized in that it contains the polyisoprene of claim 4.

13. A tire, characterized in that it uses the rubber composition of claim 9.

14. A tire, characterized in that it uses the rubber composition of claim 11.

15. A tire, characterized in that it uses the rubber composition of claim 12.

* * * * *